July 9, 1968  L. A. WADE  3,391,711
BLEEDER VALVE ASSEMBLY
Filed March 22, 1966
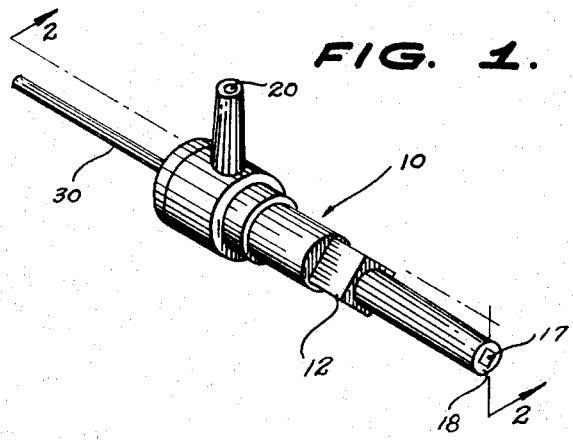
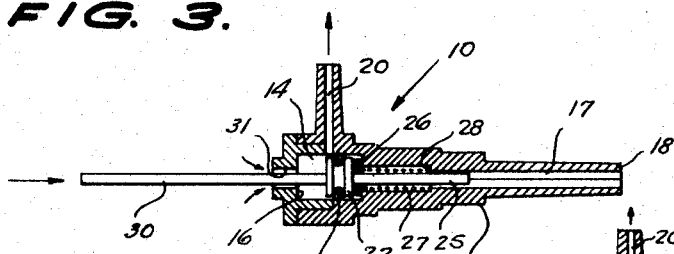
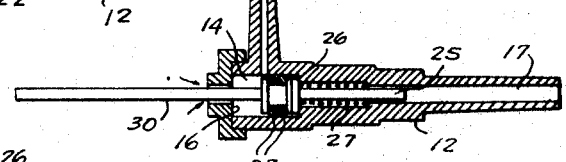
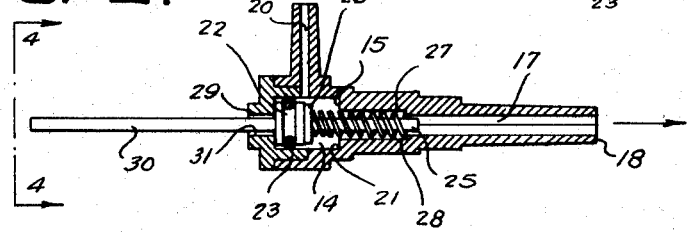
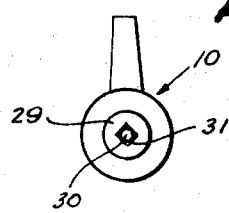
INVENTOR.
LEE A. WADE,
BY
Berman, Davidson & Berman
ATTORNEYS.

United States Patent Office 3,391,711
Patented July 9, 1968

3,391,711
BLEEDER VALVE ASSEMBLY
Lee A. Wade, Detroit, Mich., assignor to John E. Landino, Grosse Pointe Park, Mich.
Filed Mar. 22, 1966, Ser. No. 536,464
1 Claim. (Cl. 137—625.26)

ABSTRACT OF THE DISCLOSURE

A valve connecting a source of vacuum to a device to be operated by such vacuum, said valve comprising a hollow body having opposed valve seats; a stem penetrating said body, a vacuum connection at one end of said body; a device connection intermediate said valve seats; valve members on said stem for alternate coaction with said seats and a spring biasing said stem to maintain said vacuum source connected to said device to be operated thereby.

---

This invention relates to a bleeder valve assembly for use with a suction system.

An object of the present invention is to provide a bleeder valve assembly which lends itself to ready incorporation in a suction system for driving a work element.

Another object of the present invention is to provide a bleeder valve assembly which, when incorporated in a suction system for driving a work element, is normally in a position to afford direct communication of the work element with the suction source without leakage, and which, at the will of the operator, may be shifted to another position to afford direct communication of the atmosphere with the work element.

A further object of the present invention is to provide a bleeder valve assembly which, when incorporated in a suction system for driving a work element, acts positively and without leakage, and is commercially feasible.

Other objects and advantages of the present invention will become apparent from the following description taken in conjunction with the accompanying drawings, in which:

FIG. 1 is a perspective view of the bleeder valve assembly according to the present invention.

FIGURE 2 is a longitudinal sectional view taken on the line 2—2 of the valve assembly of FIGURE 1, illustrating the valve assembly in normal position.

FIGURE 3 is a longitudinal sectional view of the assembly of FIGURE 2 illustrating the valve assembly in another or shifted position.

FIGURE 4 is an end view taken on the line 4—4 of FIGURE 2.

FIGURE 5 is a longitudinal sectional view of the assembly of FIGURE 3 modified so as to include two resilient rings extending about the perimeter of the plunger.

Referring to the drawings, the numeral 10 designates, generally, the bleeder valve assembly according to the present invention, the assembly comprising an elongated casing 12 which is provided with a chamber 14 intermediate its ends 15 and 16. The casing 12 is provided with a first passage 17 which has one end opening into one end or end 15 of the chamber 14, the passage 17 extending from the chamber 14 and opening out of one end 18 of the casing 12 and adapted to be connected to a source of suction of a suction system for actuating a work element, not shown. The casing 12 is also provided with a second passage 20 which has one end opening into the chamber 14 between its ends 15 and 16, and which has the other end adapted to be connected to the work element to be driven of the suction system, not shown.

A plunger 22 is mounted in the chamber 14 for back-and-forth sliding movement between the ends 15 and 16 of the chamber 14. A resilient ring 23 extends about the perimeter of the plunger 22 between the opposite faces of the plunger and is in frictional engagement with the wall of the chamber 14, as clearly shown in FIGURES 2 and 3. The one end or end 15 of the chamber 14 is provided with a valve seat 21, the purpose of which will subsequently become apparent.

A first elongated stem 25 has one end fixedly-attached to one face of the plunger 22 and extends from the plunger 22 into the first passage 17, the stem being smaller than the passage 17 so as to provide a space between the wall of the passage 17 and the stem 25. A disc-type valve 26 extends about the attached one end of the stem 25 and is fixed to the plunger one face. Spring means is operatively-connected to the stem 25 and the passage 17 for biasing the plunger 22 to the normal position, or the position adjacent the other end or end 16 of the chamber 14, as depicted in FIGURE 2. Specifically, the spring means embodies a coil spring 27 which encircles the stem 25 and has one of its ends bearing against the disc valve 26 and has the other end bearing against a shoulder 28 formed in the first passage 17.

A second elongated stem 30 has one end fixedly-attached to the other face of the plunger 22 and extends from the other plunger face through and out of the other end or end 16 of the chamber 14 and loosely out of the other end 29 of the casing 12 and has the portion adjacent the other end projecting exteriorly of and beyond the casing 12. The other end 29 of the casing 12 is provided with a square opening which is larger in cross-section than the stem 30, thereby permitting the stem 30 to extend loosely therethrough and provide a space therearound.

Reverting to FIGURE 2, such figure shows the valve assembly in normal position. In this position, the plunger 22 is adjacent the other end or end 16 of the chamber 14, whereby affording direct communication from the second passage 20 into and through the chamber 14 and out of the chamber 14 and through and out of the first passage 17 to the suction source, not shown, the spring means or coil springs serving to bias the plunger 22 to the normal position or position adjacent the other end or end 16 of the chamber 14.

The frictional engagement of the ring 23 with the wall of the chamber 14 between the end 16 of the chamber 14 and the second passage 20 enables direct communication from the second passage 20 into and through the chamber 14 and out of the chamber 14 and through and out of the first passage 17 without leakage.

The valve assembly may be shifted from the position in which the plunger 22 is adjacent the other end or the end 16 of the chamber 14, FIGURE 2, to another position or the position in which the plunger 22 is adjacent the one end or the end 15 of the chamber 14 with the disc valve 26 in seating engagement with the valve seat 21 and the ring 23 in frictional engagement with the wall of the chamber 14 between the second passage 20 and the end 15 of the chamber 14. This may be effected by application of a depressive force to the projecting end portion of the second stem 30 of such magnitude to overcome the tension of the spring 27, resulting in the shifting of the plunger 22 from the position shown in FIGURE 2 to the position shown in FIGURE 3, wherein the plunger 22 is moved toward the one end or the end 15 of the chamber 14 with the disc valve 26 into seating engagement with the valve seat 21, thereby closing communication between the chamber 14 and the first passage 17 and affording direct communication from the atmosphere through and about the loose fit or square opening 31 in the other end 29 of the casing 12 and into and through the chamber 14 and out of the chamber 14 into and through and out of the second passage 20 to the work element of the suction system, not shown. It is to be noted that the ring 23 in frictional engagement with the wall of the chamber 14 between the second passage 20 and the one end or end 15 of the chamber 14 and the disc valve 26 in seating engagement with the valve seat 21 prevents leakage when there is direct communication from the atmosphere into and through the chamber 14 and into and out of the second passage 20.

Reverting to FIGURE 5, the form shown in such figure includes two resilient rings 23 of like contour and which extend about the perimeter of the plunger 22 between the opposite faces of the plunger and are in frictional engagement with the wall of the chamber 14. This form operates in the same manner as the valve assembly of FIGURES 1 to 4 and hereinabove described. The advantage in the operation of this form is that it provides added protection against leakage.

What is claimed is:

1. A valve for connecting a motor means alternately to a source of vacuum and the atmosphere, said valve comprising: an elongated body having an open, substantially central passage throughout its length, one end of said passage being of polygonal cross-section and, with the adjacent portion of the valve body, constituting a connection for a vacuum line, the other end of said passage also being of polygonal cross-section to define valve stem guide means and, around said means, a passage to the atmosphere, said central passage having an intermediate portion of circular cross section forming a valve seat at each of its ends; a passage constituting a connection for said motor means intersecting said intermediate portion; a valve stem penetrating both ends of said central passage and being guided by said polygonal portions; a double valve head on said stem having one portion seatable at one end of said intermediate portion, the other head being seatable on the opposite end of said portion; at least one resilient O-ring surrounding said stem between said valve heads and resilient means surrounding said stem, bearing on one of said heads and on a portion of said central passage and biasing said stem and said heads in a direction to connect said motor means to said source of vacuum.

References Cited

UNITED STATES PATENTS

| | | | |
|---|---|---|---|
| 1,490,227 | 4/1924 | Osborn | 137—625.26 |
| 1,613,164 | 1/1927 | Goode | 137—625.26 |
| 2,800,112 | 7/1957 | Williams | 137—625.26 |
| 2,919,717 | 1/1960 | Bradbury | 137—625.25 |
| 3,043,327 | 7/1962 | Wakeman | 137—625.26 XR |

HENRY T. KLINKSIEK, *Primary Examiner.*